(12) United States Patent
Levy

(10) Patent No.: US 8,037,933 B1
(45) Date of Patent: Oct. 18, 2011

(54) EXTERNALLY TESTABLE REDUNDANT SEAL CONNECTOR

(75) Inventor: David Levy, Broussard, LA (US)

(73) Assignee: PetroTechnologies, Inc., Broussard, LA (US)

( * ) Notice: Subject to any disclaimer, the term of this patent is extended or adjusted under 35 U.S.C. 154(b) by 364 days.

(21) Appl. No.: 12/248,558

(22) Filed: Oct. 9, 2008

(51) Int. Cl.
*E21B 19/00* (2006.01)
*F16L 17/08* (2006.01)

(52) U.S. Cl. .......... 166/242.3; 166/250.01; 285/96; 285/343

(58) Field of Classification Search ........... 166/250.01, 166/379, 242.6; 285/93, 96, 106, 108, 113, 285/339, 342, 343
See application file for complete search history.

(56) References Cited

U.S. PATENT DOCUMENTS

| | | | | | |
|---|---|---|---|---|---|
| 5,833,490 | A | * | 11/1998 | Bouldin | 439/462 |
| 6,056,327 | A | * | 5/2000 | Bouldin et al. | 285/93 |
| 6,269,683 | B1 | * | 8/2001 | Jackson | 285/93 |
| 7,219,736 | B1 | * | 5/2007 | Levy | 166/250.01 |
| 7,784,838 | B2 | * | 8/2010 | Levy | 285/342 |
| 2007/0096465 | A1 | * | 5/2007 | Hall et al. | 285/342 |

* cited by examiner

*Primary Examiner* — David Bagnell
*Assistant Examiner* — Elizabeth Gottlieb
(74) *Attorney, Agent, or Firm* — Buskop Law Group, PC; Wendy Buskop

(57) ABSTRACT

An externally testable redundant seal connector for a well comprising a connector body and a ferrule disposed on an end of the connector body. The ferrule is adapted for forming a primary seal between an outer diameter of the connector body and a profile in a mandrel. A sealing groove can be formed on the outer diameter of the connector body. A sealing device can be disposed in the sealing groove. A conduit can be formed in the connector body parallel to but disconnected from the thru-bore. Ports can be disposed in the connector body for receiving fluid and introducing fluid to at least one conduit. A plug can be insertable in each port upon completion of testing wherein each plug forms a secondary seal between the connector and the mandrel.

20 Claims, 3 Drawing Sheets

US 8,037,933 B1

EXTERNALLY TESTABLE REDUNDANT SEAL CONNECTOR

FIELD

The present embodiments relate to an externally testable redundant seal connector for a well and a method for testing the well with the seal connector.

BACKGROUND

A need exists for an externally testable redundant seal connector for an oil well that resists being pulled from a profile of a mandrel.

A further need exists for an externally testable redundant seal connector that is more robust, and can withstand more vibration and axial pull than other single seal connectors for well.

A need also exists for an externally testable redundant seal connector that is easy to install.

The present embodiments meet these needs.

BRIEF DESCRIPTION OF THE DRAWINGS

The detailed description will be better understood in conjunction with the accompanying drawings as follows.

DETAILED DESCRIPTION OF THE EMBODIMENTS

Figure 1A:
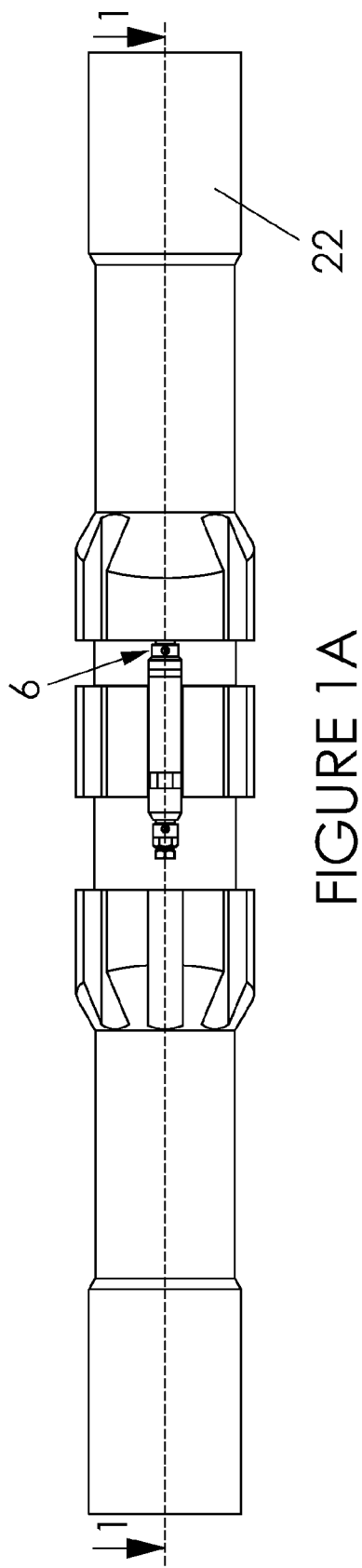
FIG. 1A depicts a top view of an embodiment of the externally testable redundant seal connector for use in a well.

Before explaining the present apparatus in detail, it is to be understood that the apparatus is not limited to the particular embodiments and that it can be practiced or carried out in various ways.

The present embodiments relate to an externally testable redundant seal connector for a well. The well can be an oil well, a water well, a steam injection well, an injection well or similar of well. It can be used in a subsea well or a land based well.

The present embodiments further relate to an externally testable redundant seal connector for a well comprising a connector body with a thru-bore for flowing fluid down a well from the surface.

The connector body can be threadable with a mandrel to support a check valve, a down hole pressure gauge, a down hole temperature gauge, a gas lift valve, or other down hole tools.

The connector body can be comprised of steel alloy, nickel alloy, carbon steel, other steel or combinations thereof. It is also contemplated that the connector body can be coated to reduce friction on the threads.

The embodiment can include a ferrule disposed on an end of the connector body. The ferrule can be adapted to slidably engage the outer diameter of the connector body to form a primary seal between the mandrel and an annulus of the well. The primary seal can be formed by deforming the ferrule using compression with the mandrel. Usable ferrules can be purchased from Petrotechnologies, Inc., of Broussard, La., such as part no. 120M005A.

A first sealing groove can be formed on the outer diameter of the connector body. More than one sealing groove can be used with accompanying sealing means if desired. The groove can be about 0.07 inches in depth and can be formed of a design that can support an o-ring sealing device, with rounded corners.

At least one first sealing means can be disposed in the at least one first sealing groove. It is possible that a second or back up o-ring can be used in the sealing groove to increase the compression on the o-ring so that no gas flows out of the connector.

At least one test conduit can be formed in the connector body parallel to, but disconnected from, the thru-bore and can be parallel to the body axis. It is contemplated that the test conduit does not have to be parallel to the body axis. The test conduit can be placed at an angle to the body axis in the connector body. The test conduit can comprise a test conduit diameter ranging from about 0.015 inches to about 0.125 inches.

A test port can be disposed in the connector body for receiving a test fluid, and introducing the test fluid to one of the at least one test conduit. The test port can have a test port diameter ranging from about 0.015625 inches to about 0.5 inches. The test port can be cylindrical with a tapered metal to metal seal at one end. It is also contemplated that the test port can have a threaded engagement for receiving a test plug.

It is contemplated that each test port can receive test fluid from a secondary source. A pump can pump the test fluid from the secondary source to either or both test ports simultaneously. The test fluid can be water, compressed air, oil, compressed nitrogen, compressed helium, another compressed inert gas or combinations thereof.

In an embodiment, the test fluid can be compressed gas, which can be at a pressure between about 1 atm to about 40,000 psi.

The test pump can be a small hand pump, ENERPAC pump or any pump capable of flowing between about 1 milliliter to about 10 milliliters of gas or fluid into the test conduit and can also be adapted to reach a test pressure of about 1000 psi to about 20000 psi.

It is contemplated that the test plug can be removed for testing and re-installed into the test port upon completion of testing. Each test plug can form a secondary seal between the annulus of the well and the thru-bore of the connector.

Referring now to FIG. 1A, a top view of an embodiment of the externally testable redundant seal connector. This view shows the connector (6) connected to a mandrel (22), which can engage a valve or a pressurized tube for flowing pressurized fluids from the surface of a well. The connector is fast to install, taking between about 3 minutes to about 5 minutes. The connector can also provide a more environmentally sound connection with the pressurized fluid coming from the surface, because it can provide at least 2 additional redundant seals.

Figure 1B:
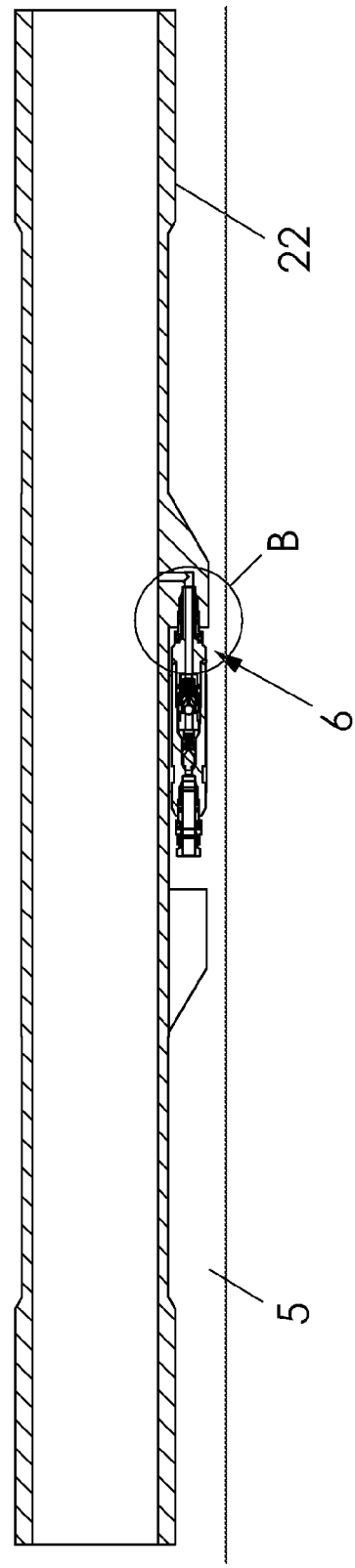
FIG. 1B depicts a cross-sectional view of the externally testable redundant seal connector of FIG. 1A along line 1-1.

Referring now to FIG. 1B, a cross-sectional view of the externally testable redundant seal connector of FIG. 1A along line 1-1.

An externally testable redundant seal connector (6) is shown connected to a mandrel (22) which is shown disposed in the annulus (5). Typically, the connector can be used in a well at a depth of about 4,000 feet to about 25,000 feet.

Figure 2:
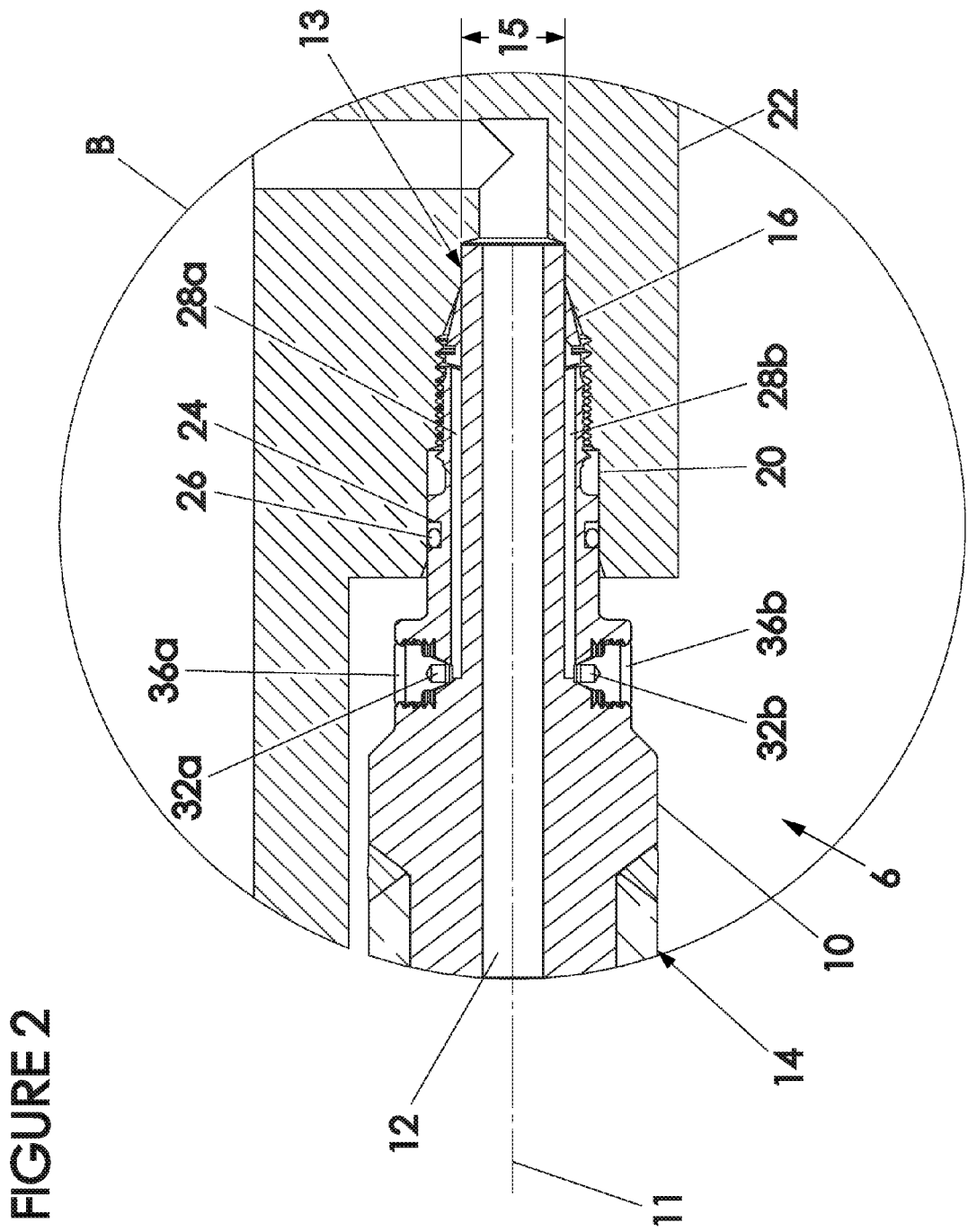
FIG. 2 depicts a detailed view of an embodiment of the connector.

Referring now to FIG. 2, which is a detailed an exploded view of section B of FIG. 1B.

This figure shows an externally testable redundant seal connector (6) having a connector body (10), a connector body axis (11) and a thru-bore (12). The thru-bore can have a diameter ranging from about 0.1 inches to about 1.5 inches.

The thru-bore can pass methanol, a hydrate inhibitor or paraffin inhibitor, a hydraulic fluid to operate a valve, or a fluid to operate a sliding sleeve. The fluid passing though the thru-bore can flow at up to about 10 gallons per minute. The thru-bore fluid pressure can be used to monitor pressure inside the production tubing, inside the mandrel, or inside the well.

In an embodiment, fluid can be pumped into the connector or the connector can be screwed to a gauge to read the surrounding pressure of fluid in the well.

In another embodiment, the connector body (10) can have a first end (13) and a second end (14) opposite the first end. The diameter of the connector body is depicted as element (15). The connector body can have a diameter ranging from about 0.5 inches to about 2 inches and can have a length of between about 0.5 inches to about 5 inches.

A ferrule (16) can be disposed on the first end (13) of the connector body (10). The ferrule can be made a high nickel alloy ferrule to prevent corrosion. The ferrule can form a primary seal between the outer diameter of the connector body (10) and a profile (20) in a mandrel (22). This primary seal prevents fluid of the thru-bore from reaching the fluid of the annulus.

A first sealing groove (24) can be formed on the outer diameter of the connector body (10) and at least one first sealing means (26) can be disposed in the at least one first sealing groove. The first sealing means can be an o-ring, an energizable rotatable flexible metal seal, a metal to metal seal or combinations thereof.

A test conduit (28) can be formed in the connector body (10) parallel to, but disconnected from, the thru-bore (12). The test conduit can be straight, curved or other patterns as well.

While FIG. 2 depicts two test conduits (28a and 28b), it is contemplated that more than two test conduits can be formed in the connector body (10), in case during assembly one of the test conduits is oriented in a manner that is not easily accessible.

It is also contemplated that fewer than two test conduits can be formed in the connector body (10).

Figure 3:
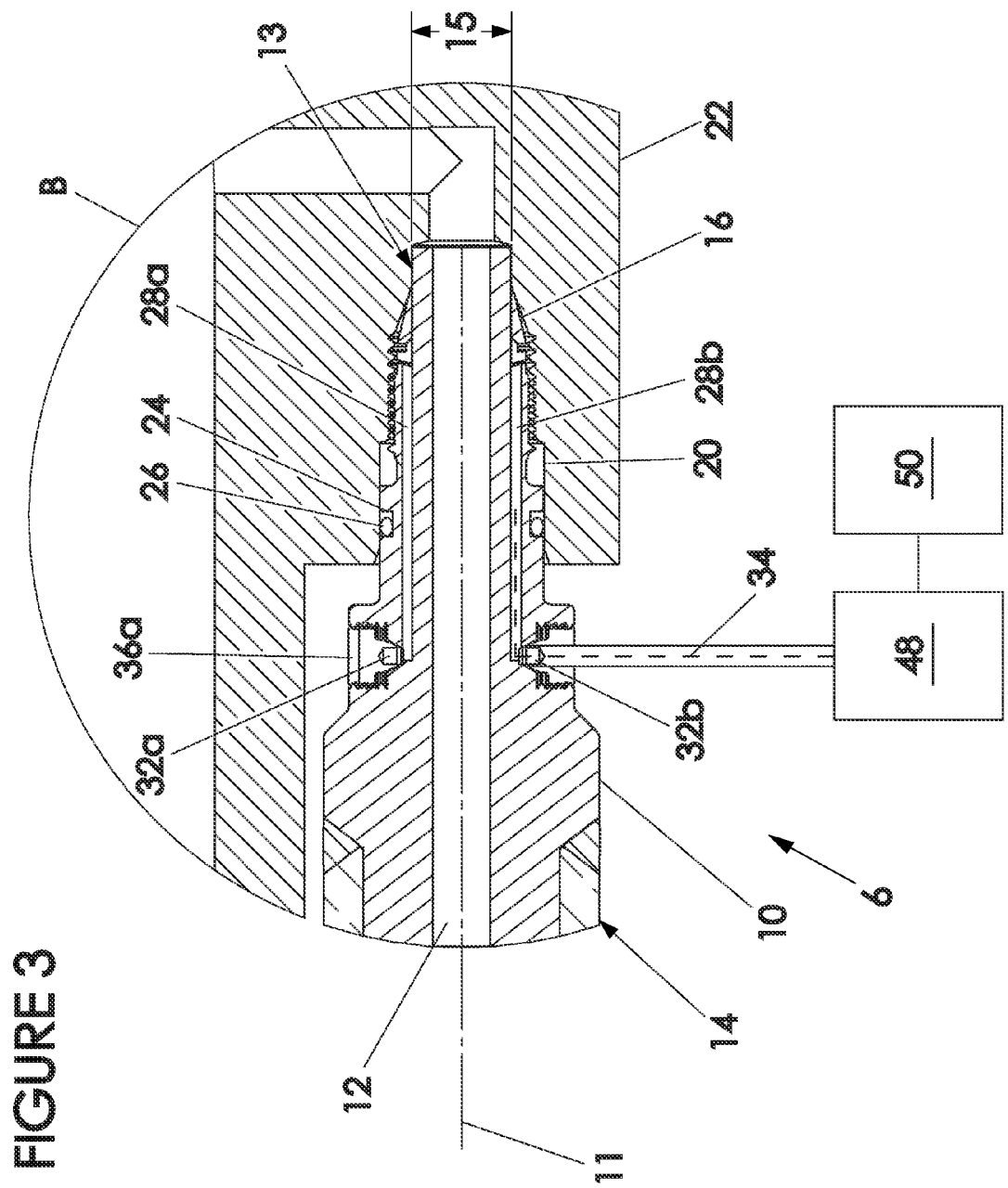
FIG. 3 depicts an additional detailed view of an embodiment of the connector connected to a secondary source with a test pump The present embodiments are detailed below with reference to the listed Figures.

A test port (32a and 32b) can be disposed in the connector body for receiving a test fluid (34), which can best be seen in FIG. 3, and introducing the test fluid to one of the test conduits (28a or 28b).

It is contemplated that the connector body (10) can contain a test port (32a or 32b) for each test conduit the connector body contains.

A test plug (36) can be removed for testing and re-installed into the test port upon completion of testing. It is contemplated that each test plug can form a secondary seal between the primary seal and the annulus.

FIG. 3 shows a detailed view of section B of FIG. 1B, wherein the externally testable redundant seal connector for a well is depicted connected to a secondary source (48).

Each test port (32) can receive test fluid (34) from a secondary source (48). A pump (50) can pump the test fluid from the secondary source to either or both test ports (32a, 32b) simultaneously.

It is contemplated that the test fluid (34) can be water, compressed air, oil, compressed nitrogen, compressed helium, another compressed inert gas or combinations thereof.

The test fluid can flow through the test port and be introduced to one of the test conduits for testing using the pump, wherein the pump pressures are up to about 20,000 psi.

Once testing is complete, the test plug can be inserted into each of the test ports on the connector body. Each test plug can form a secondary seal.

While these embodiments have been described with emphasis on the embodiments, it should be understood that within the scope of the appended claims, the embodiments might be practiced other than as specifically described herein.

What is claimed is:

1. An externally testable redundant seal connector for a well having an annulus comprising:
    a. a connector body having a thru-bore further comprising a first end and a second end and a connector body axis;
    b. a ferrule disposed on the first end of the connector body, wherein the ferrule is adapted for forming a primary seal between an outer diameter of the connector body and a profile in a mandrel;
    c. at least a first sealing groove formed on the connector body;
    d. at least one first sealing means disposed in the at least one first sealing groove;
    e. at least one conduit formed in the connector body and disconnected from the thru-bore, wherein the at least one conduit has a first opening located between the first end and the second end of the connector body and a second opening formed through the first end of the connector body;
    f. at least one port disposed in the connector body, wherein the first opening of the at least one conduit is adjacent to the at least one port, and wherein the at least one port is for receiving fluid and introducing fluid to the at least one conduit; and
    g. a plug insertable in each port upon completion of testing, wherein each plug forms a secondary seal between the connector body and the mandrel; wherein the connector body is threadable with the mandrel.

2. The externally testable redundant seal connector of claim 1, wherein the connector body comprises an outer diameter ranging from 0.50 inches to 2 inches.

3. The externally testable redundant seal connector of claim 1, wherein the connector body comprises steel alloy, nickel alloy, carbon steel, other steel and combinations thereof.

4. The externally testable redundant seal connector of claim 1, wherein the thru-bore has a diameter ranging from 0.1 inches to 1.5 inches.

5. The externally testable redundant seal connector of claim 1, wherein the connector body supports a check valve, a down hole pressure gauge, a down hole temperature gauge, a gas lift valve, or other down hole tools.

6. The externally testable redundant seal connector of claim 1, wherein the connector body is between 0.5 inches and 5 inches in length.

7. The externally testable redundant seal connector of claim 1, wherein the ferrule slidingly engages the outer diameter of the connector body and forms the primary seal between the mandrel and an annulus of the well.

8. The externally testable redundant seal connector of claim 1, wherein each port flows the fluid from a secondary source to the conduit.

9. The externally testable redundant seal connector of claim 8, wherein the fluid is selected from the group consisting of: compressed gas, water, compressed air, oil, compressed nitrogen, compressed helium or another compressed inert gas.

10. The externally testable redundant seal connector of claim 8, wherein the fluid is compressed gas, and wherein the compressed gas is at a pressure between 14.7 psi and 40,000 psi.

11. The externally testable redundant seal connector of claim 8, further comprising a pump connected to the secondary source for flowing fluid into the conduit.

12. The externally testable redundant seal connector of claim 1, wherein the conduit comprises a conduit diameter ranging from 0.015 inches to 0.125 inches.

13. The externally testable redundant seal connector of claim 1, wherein the at least one first sealing means is at least one o-ring.

14. The externally testable redundant seal connector of claim 1, wherein the at least one first sealing means is at least one energizable rotatable flexible metal seal.

15. The externally testable redundant seal connector of claim 1, wherein the at least one first sealing means is a metal to metal seal.

16. The externally testable redundant seal connector of claim 1, wherein each plug is removable and re-installable.

17. The externally testable redundant seal connector of claim 1, wherein each port is a threaded port.

18. The externally testable redundant seal connector of claim 1, wherein each port has a diameter ranging between 0.015625 inches to 0.5 inches.

19. The externally testable redundant seal connector of claim 1, wherein each plug is tapered.

20. The externally testable redundant seal connector of claim 1, wherein the primary seal is formed by deforming the ferrule using compression with the mandrel.

* * * * *